UNITED STATES PATENT OFFICE.

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

PROCESS OF MAKING STORAGE-BATTERY SEPARATORS.

1,357,379.     Specification of Letters Patent.     Patented Nov. 2, 1920.

No Drawing.     Application filed February 27, 1919. Serial No. 279,613.

*To all whom it may concern:*

Be it known that I, HARRY L. BOYER, a citizen of the United States, residing at Trenton, in the county of Mercer and State of New Jersey, have invented a certain new and useful Improvement in Processes of Making Storage-Battery Separators, of which the following is a full, clear, and exact description.

This invention relates to a process of producing storage battery separators having the characteristics and made in accordance with the processes described and claimed in patents granted to T. A. Willard, October 16, 1917, and numbered respectively 1,243,368 and 1,243,370.

In accordance with the Willard patents above mentioned, a block or body is built up of fibrous or porous material which may be woven cloth, or unwoven threads or strands and an insulating cementing agency, and subsequently this block or body after being compressed into a solid mass (and partially vulcanized if rubber is the insulating cementing agency) is sliced into sections which are subsequently converted into the finished separators.

Preferably this block or body is built up either of alternate layers of the porous material and insulating cementing material or of superimposed layers of porous material suitably coated or treated with the cementing agency, but generally it is built up of rubber frictioned cloth. When this body is subsequently sliced into separator sections, the slicing or cutting is done at right angles to the fibrous or porous material, so that each section has a multitude of small, closely associated threads extending transversely from one side thereof to the other, the purpose of these threads being to give the separator minute closely associated pores.

In producing the block or body, and especially in preparing it for slicing, it is necessary to subject it to very high pressure which has a tendency to flatten the threads, and this tends to decrease the porosity of the finished separator.

The chief object of this invention is to prevent the threads being flattened under this pressure, and therefore to increase the porosity of the finished separator by maintaining the individual threads substantially in their original round shape and at their maximum cross sectional areas.

Preliminary to an explanation of the process step or steps which directly involve my invention, it may be mentioned that both the form of the porous material and the type of insulating cementing agency used therewith to form the block or body may be varied. The porous material may be in the form of unwoven strands or threads, or it may be woven cloth or fabric. The cementing agency may be rubber, or may be some other suitable material such as celluloid. Furthermore, the block or body may be built up in different ways, such as by alternate layers of porous material and insulating cementing material, or by simply superimposing layer upon layer, the porous material previously coated or treated with insulating cementing material. Preferably, however, the block or body is built up of cloth or woven fabric and rubber, and I prefer to build up the block or body by rubber frictioning the fabric and laying up the layers one over the other until a body of sufficient thickness is formed.

Coming now to the new steps invented by me for the attainment of the objects previously stated, I take the porous material before it is incorporated in the block or body which is sliced into the separator sections, and treat it so that the individual strands or threads are stiffened or hardened to enable them to effectively resist the severe pressure to which they are subsequently subjected, and in carrying out my invention this is accomplished by passing the porous material through, or otherwise subjecting it to the action of a substance which has the effect of stiffening or hardening the threads or strands.

The substance which I find answers the requirements very effectively, is starch, that is to say, the porous material is subjected to a starching operation. This is carried out in practice by running the porous material through a starching machine which has been filled with a fairly thick solution of starch, and then the starched porous material is dried preferably by passing the same through a suitable drying machine.

After the porous material has been starched and dried so as to stiffen or harden the individual threads, the process is then continued to produce the finished separator, substantially as outlined in the Willard patents above referred to, that is to say, the block or body of the porous material and the cementing agency is built up and is compressed to make a solid mass; it is then partially vulcanized, if rubber is used as a cementing agency, and subsequently it is sliced into the separator sections which are then more completely hardened or vulcanized, and generally ribbed to produce the finished separators. It was previously stated that rubber frictioned cloth is preferably used in carrying out the process, in which event, woven fabric or cloth in strip form, of the proper width is starched and dried as above described, and is then rubber frictioned in the ordinary manner, and is then placed layer upon layer to form the composite block or body to be vulcanized and sliced.

It has been found as a result of the starching process, that under the severe pressure utilized in producing the block and preparing it for slicing, the individual threads or strands are not flattened, but substantially maintain their round shape, and this has the effect of increasing the porosity of the finished separators over that which would obtain if the threads were flattened. Furthermore, the starching process leaves around the threads a very thin coating of starch which is dissolved by the electrolyte when the separator is placed in a battery, and this also serves to increase the porosity of the separator.

When cloth is used which has been starched and dried and subsequently rubber frictioned, since the porosity of the separator is increased by the starching process, I am enabled to use a cloth of more open weave than is required for a given porosity if the fabric is not subjected to the stiffening or hardening process, and in using fabric of relatively open weave, since the rubber is squeezed into the interstices of the cloth in the rubber frictioning step of the process, the strength of the finished separator is increased, that is to say, the separator is made substantially as strong parallel to the layers as at right angles thereto.

I might add in conclusion that though starch is preferably employed for the stiffening or hardening step of the process, other substances might be employed, such for example as glue or silicate of soda. However, starch is preferred to either of the last mentioned substances for the reason that when the separator is placed in a battery, the electrolyte quickly dissolves the starch, whereas both glue and silicate of soda are not so soluble in the electrolyte.

Having described my invention, I claim:

1. The step in the process of making separators by building up a block or body of porous and insulating cementing material and slicing the body into separator sections, which comprises treating the porous material so as to stiffen or harden it.

2. The step in the process of making porous separators from a compacted block or body containing porous material and insulating cementing material, which consists in subjecting the porous material to the action of a stiffening or hardening substance before being incorporated into the block or body.

3. The process of making porous storage battery separators which comprises subjecting porous material to the action of a stiffening or hardening substance such as starch, incorporating said porous material in a block or body, and subsequently slicing the block or body into separator sections.

4. The process of forming porous separators which comprises subjecting porous material to the action of a stiffening or hardening substance, such as starch, drying the porous material, forming a compacted body of the porous material and a cementing agency, and slicing the body into separate sections.

5. The step in the process of making porous separators wherein a composite block of porous material and a cementing agency is built up, compacted and sliced into separator sections, which comprises coating the porous material before being incorporated in the block with a substance which is soluble in the electrolyte of a battery.

In testimony whereof, I hereunto affix my signature.

HARRY L. BOYER.